United States Patent
Hauck (10) Patent No.: US 9,201,913 B2
(45) Date of Patent: Dec. 1, 2015

(54) MANAGING A FILE-BASED VERSIONING SYSTEM

(71) Applicant: Ralf-Juergen Hauck, Heidelberg (DE)

(72) Inventor: Ralf-Juergen Hauck, Heidelberg (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 13/923,579

(22) Filed: Jun. 21, 2013

(65) Prior Publication Data

US 2014/0379650 A1    Dec. 25, 2014

(51) Int. Cl.
*G06F 7/00* (2006.01)
*G06F 17/30* (2006.01)
*G06F 11/14* (2006.01)

(52) U.S. Cl.
CPC ...... *G06F 17/30309* (2013.01); *G06F 11/1446* (2013.01)

(58) Field of Classification Search
CPC .................................................. G06F 11/1446
USPC ........................................................ 707/640
See application file for complete search history.

(56) References Cited

U.S. PATENT DOCUMENTS

| | | | |
|---|---|---|---|
| 6,662,357 B1 | 12/2003 | Bowman-Amuah | |
| 6,735,765 B1 * | 5/2004 | Schumacher | 717/164 |
| 7,310,653 B2 | 12/2007 | Coyle et al. | |
| 7,593,958 B2 | 9/2009 | Bergstraesser et al. | |
| 7,684,964 B2 | 3/2010 | Outhred et al. | |
| 7,721,257 B2 | 5/2010 | Demuth et al. | |
| 7,926,056 B2 | 4/2011 | Lier et al. | |
| 8,200,787 B2 | 6/2012 | Schulz et al. | |
| 8,286,132 B2 | 10/2012 | Yuan et al. | |
| 8,321,856 B2 | 11/2012 | Auer et al. | |
| 8,326,889 B2 | 12/2012 | Kaisermayr | |
| 2002/0138746 A1 * | 9/2002 | Buttner et al. | 713/189 |
| 2005/0131990 A1 * | 6/2005 | Jewell | 709/201 |
| 2006/0123392 A1 | 6/2006 | Demuth et al. | |
| 2007/0250543 A1 * | 10/2007 | Ichinose | 707/200 |
| 2009/0307284 A1 * | 12/2009 | Welingkar et al. | 707/204 |
| 2011/0078211 A1 | 3/2011 | Gass et al. | |
| 2011/0283269 A1 | 11/2011 | Gass et al. | |
| 2012/0011399 A1 * | 1/2012 | Park | 714/16 |
| 2012/0246115 A1 | 9/2012 | King et al. | |
| 2012/0324069 A1 | 12/2012 | Nori et al. | |
| 2012/0331447 A1 | 12/2012 | Nayak et al. | |

* cited by examiner

*Primary Examiner* — Charles Lu
(74) *Attorney, Agent, or Firm* — Fish & Richardson P.C.

(57) ABSTRACT

Techniques for managing a file-based versioning of data objects include receiving, from a back-end computing system, a transport request that includes an updated transport object, the updated transport object including serialized database content of a data object; converting the serialized database content of the updated transport object to file-based content; storing the file-based content of the updated transport object in a repository over a previously-stored version of the transport object; and updating a database that includes a change history of the data object based on the storage of the file-based content in the repository.

20 Claims, 3 Drawing Sheets

MANAGING A FILE-BASED VERSIONING SYSTEM

TECHNICAL BACKGROUND

This disclosure relates to managing a file-based versioning system, and particularly, converting serialized database content to file-based content of the file-based versioning system.

BACKGROUND

A change and transport system (CTS) is a tool that facilitates organization of development projects, e.g., by an end-user associated with the development projects. Further, the CTS transports changes (e.g., of the development projects) and customizations between back-end computing systems in a distributed computing environment. Further, the CTS distributes changes between the computing systems in the distributed computing environment.

SUMMARY

The present disclosure relates to computer-implemented methods, software, and systems for managing a file-based versioning of data objects. In some implementations, a transport request is received from a back-end computing system. The transport request includes an updated transport object. The updated transport object includes serialized database content of a data object. The serialized database content of the updated transport object is converted to file-based content. The file-based content of the updated transport object is stored in a repository over a previously-stored version of the transport object. A database is updated that includes a change history of the data object based on the storage of the file-based content in the repository.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, storing the file-based content of the updated transport object further includes identifying the previously-stored version of the updated transport object; and replacing the previously-stored version of the transport object with the updated transport object.

A second aspect combinable with any of the previous aspects includes receiving a request from an additional back-end computing system for the updated transport object; in response to receiving the request, converting the file-based content of the stored updated transport object to a transport data-file; and providing, to the additional back-end computing system, the updated transport object including the transport data-file.

A third aspect combinable with any of the previous aspects further includes, prior to providing, to the additional back-end computing system, the updated transport object including the transport data-file, providing a visualization of the updated transport object, the visualization including a visual preview of the updated transport object against an active data object associated with the updated transport object.

In a fourth aspect combinable with any of the previous aspects, the file-based content includes one or more file-lines.

In a fifth aspect combinable with any of the previous aspects, converting the serialized database content of the transport object to file-based content further includes converting each row of data of the serialized database content to a file-line of the file-based content.

A sixth aspect combinable with any of the previous aspects includes identifying a name identifier associated with the data object.

In a seventh aspect combinable with any of the previous aspects, storing the file-based content of the updated transport object further includes storing the file-based content as a file; and associating the identified name identifier with the file.

An eighth aspect combinable with any of the previous aspects includes wherein the repository stores file-based content for multiple transport objects.

A ninth aspect combinable with any of the previous aspects further includes identifying one or more updated transport objects of the multiple transport objects; restoring, for each identified updated transport object, the identified updated transport object to a previously-stored version of the transport object; and providing, to the additional back-end computing system, the restored versions of the transport objects.

In a tenth aspect combinable with any of the previous aspects, the data object includes a repository object, or a customizing object.

Various implementations of a computing system according to the present disclosure may have one or more of the following features. For example, such features include providing a history of which data objects were active at a given time; visualization of the changes prior to implementations; merging content of consecutive transport requests; splitting of transport requests; and rolling-back of transport requests.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
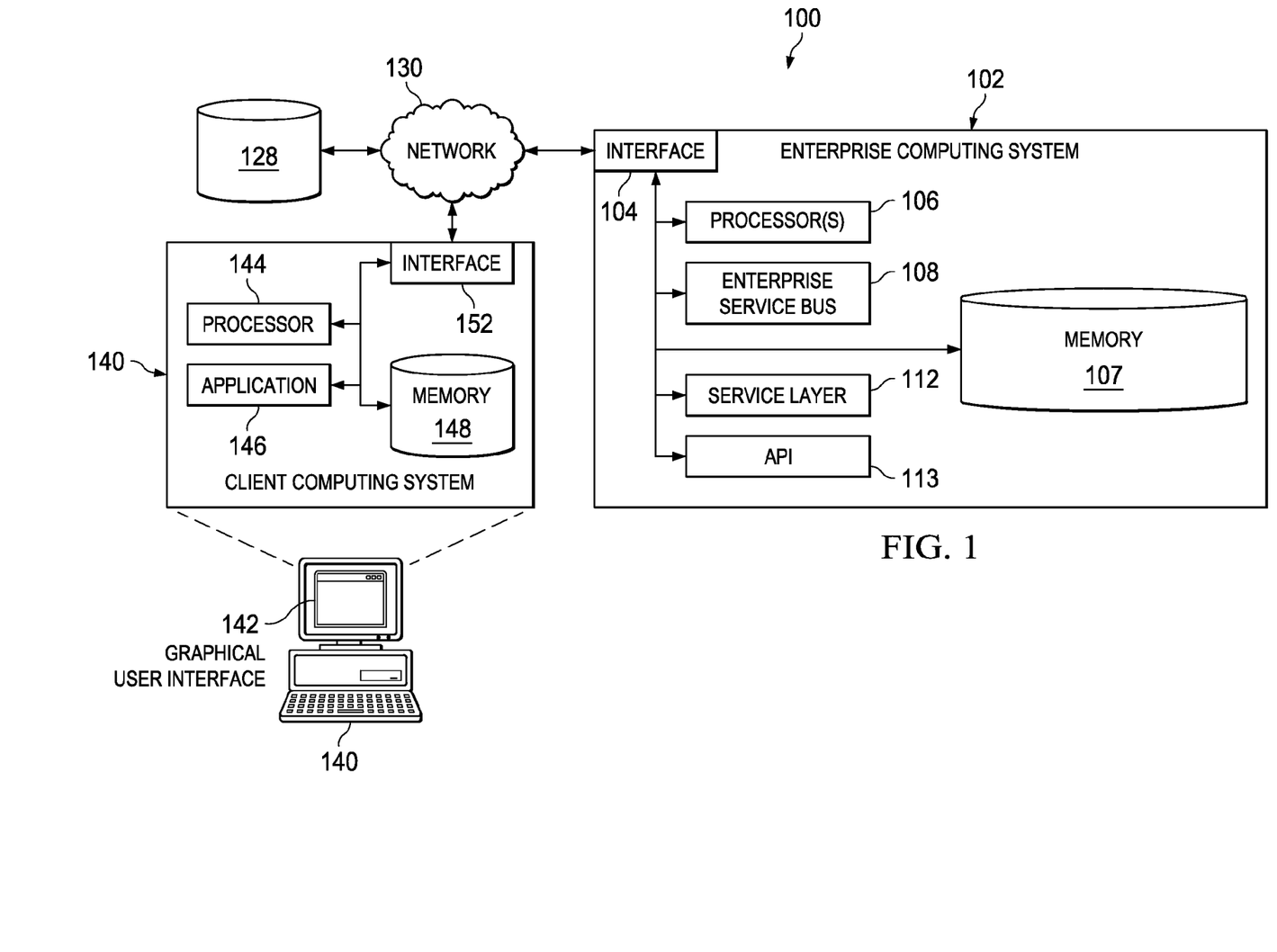
FIG. 1 illustrates an example distributed computing system for managing a file-based versioning of data objects.

FIG. 1 illustrates an example distributed computing system 100 for managing a file-based versioning of data objects. In some implementations, a transport request is received from a back-end computing system. The transport request includes an updated transport object. The updated transport object includes serialized database content of a data object. The serialized database content of the updated transport object is converted to file-based content. The file-based content of the updated transport object is stored in a repository over a previously-stored version of the transport object. A database is updated that includes a change history of the data object based on the storage of the file-based content in the repository.

In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed via the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (i.e., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
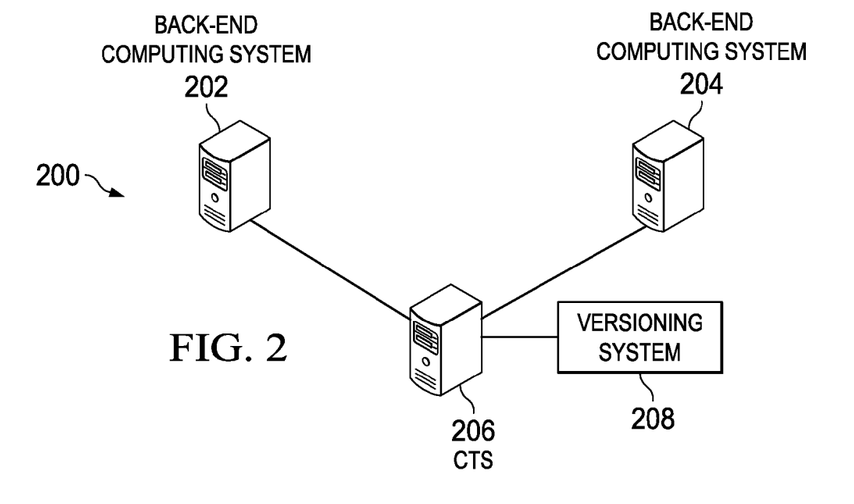
FIG. 2 illustrates a system for managing a file-based versioning of data objects.

FIG. 2 illustrates a system 200 for managing a file-based versioning of data objects. System 200 includes a first back-end computing system 202, a second back-end computing system 204, a change and transport system (CTS) 206, and a versioning system 208. For simplicity of illustration, the system 200 is shown including the first and the second back-end computing systems 202 and 204; however, the system 200 can include any number of back-end computing systems. Additionally, the system 200 can be implemented by the enterprise computing system 102, the client computing system 140, or a combination thereof. For example, the first back-end computing system 202, the second back-end computing system 204, the CTS 206, and the versioning system 208 can be implemented by the enterprise computing system 102. In some implementations, the system 200 can further include a client computing system (not shown), similar to the client computing system 140, for accessing the first back-end system 202, the second back-end system 204, the CTS 206, and/or the versioning system 208.

The first and the second back-end computing systems 202 and 204 are in communication with the CTS 206 (e.g., over the network 130). In some implementations, the first and the second back-end computing systems 202 and 204 are in communication with each other. In some examples, the first and/or the second back-end computing systems 202 and 204 include one or more servers. That is, the first and/or the second back-end computing systems 202 and 204 are distributed computing environments. In some implementations, the first back-end computing system 202 and/or the second back-end computing system 204 include a development computing system, a testing computing system, and/or a productive computing system. For example, a development computing system can include a computing system for creating changes in data objects (e.g., by a user of the client computing system); the testing computing system can include a computing system for testing the created changes in the data objects; and the productive computing system can include a computing system for providing the functionalities of the changes in the data objects.

The CTS 206 is in communication with the first and the second back-end computing systems 202 and 204, and the versioning system 208. In general, the CTS 206 receives transport requests, e.g., from the first back-end computing system 202, that record changes to data objects (e.g., repository objects or customizing objects). Further, the content of the data objects recorded in the transport requests are read, and serialized in a data-file (e.g., the first back-end computing system 202 exports the transport request). Additionally, to provide the changes to the data objects in the transport requests, e.g., to the second back-end computing system 204, the CTS 206 de-serializes the data-file and the data objects are provided (e.g., imported to the second back-end computing system 204).

The versioning system 208 is in communication with the CTS 206. However, in some implementations, the versioning system 208 is further in communication with one or more of the first and the second back-end computing systems 202 and 204. In general, the versioning system 208 provides functionality of storing the change history of the data objects, including a visualization of such change history. In some implementations, the CTS 206 can include the versioning system 208. In some implementations, the versioning system 208 can be distributed within the system 200. That is, for example, the versioning system 208 can be distributed among the first and the second back-end computing system 202 and 204 and/or the CTS 206.

To the end, the system 200 manages a file-based versioning of the data objects. Particularly, in some implementations, a transport request is received that includes an updated transport object, the updated transport object including serialized database content of a data object. Specifically, the CTS 206, the versioning system 208, or both, receive (e.g., over the network 130), from the first back-end computing system 202, the transport request that includes the updated transport object that includes serialized database content of the data object. The updated transport object can be associated with an update to the data object (e.g., an updated data object). In some examples, the updated transport object can include a previous version of the transport object (corresponding to a previous version of the data object) and one or more updates (e.g., changes and/or customizations) to the transport object. In some examples, the updated transport object can include the update previously applied to the transport object.

In some examples, the first back-end computing system 202 identifies the data object. For example, the first back-end computing system 202 identifies a repository object that includes source code of a software program (e.g., a report). Further, for example, the first back-end computing system 202 identifies a customizing object that includes a database associated with a specific customization of a system. In some examples, the first back-end computing system 202 identifies the data object by manual or automatic recording of the development infrastructure of the system 200. The first back-end computing system 202 creates the transport request including the transport objects.

In some examples, the first back-end computing system 202 identifies two or more data objects. To that end, when the first back-end computing system 202 identifies two or more data objects, the first back-end computing system 202 can group the transport objects associated with the data objects into a logical unit (e.g., the transport request).

In some examples, the serialized database content includes a data-file associated with the data object. Specifically, the data is read from a database (e.g., associated with the data object) and is serialized into the data-file.

In some implementations, the serialized database content of the updated transport object is converted to file-based content. Specifically, the CTS 206, the versioning system 208, or both, covert the serialized database content of the updated transport object received from the first back-end computing system 202 to file-based content. For example, the serialized database content is converted to a "files and folder" structure that the versioning system 208 is associated with.

In some examples, the file-based content can include one or more file-lines, and the serialized database content can include one or more rows of data. To that end, converting the serialized database content of the transport request includes converting each row of data of the serialized database content to a file-line of the file-based content. For example, when the serialized database content is associated with a repository object (e.g., a system report), each row of data of the serialized database content is converted to a file-line of the file-based content. Additionally, in some examples, the CTS 206, the versioning system 208, or both, identify a name identified associated with the data object (e.g., a "title" of the system report). In some examples, the serialized database content can include a single row in a database table (e.g., when the data object is a customizing object).

In some implementations, the file-based content of the updated transport object is stored in a repository over a previously-stored version of the transport object. Specifically, the CTS 206, the versioning system 208, or both, store the file-based content of the updated transport object in a repository (e.g., the repository 128) over a previously-stored version of the transport object. For example, the CTS 206, the versioning system 208, or both, identify the previously-stored version of the updated transport object. Identifying the previously-stored version of the transport object can include matching a name associated with the updated transport objected with the previously-stored version of the updated transport object, or otherwise "matching" metadata associated with the updated transport object with metadata associated with the previously-stored version of the updated transport object. For example, matching of an ID number of the updated transport object with an ID number of the previously-stored version of the transport object. In some examples, subsequent to identifying the previously-stored version of the updated transport object, storing the file-based content of the updated transport object can further include replacing the previously-stored version of the transport object with the updated transport object.

In some examples, storing the file-based content of the updated transport object includes storing the file-based content as a file (e.g., a file in a "files and folder" structure that the versioning system 208 is associated with). Additionally, as mentioned above, the name identified with the associated data object is identified (e.g., a "title" of the system report). To that end, the CTS 206, the versioning system 208, or both, associate the identified name identifier with the file.

In some implementations, a database is updated that includes a change history of the data object based on the storage of the file-based content in the repository. Specifically, the CTS 206, the versioning system 208, or both, update a database that includes the change history of the data object based on the storage of the file-based content in the repository. For example, the database can include, for the data object, each version of the transport object, including the previous version of the transport object and the updated transport object. Specifically, the database stores the consecutive changes of the data object, that is, the database stores each version of the transport object. Thus, the change history of the data object is stored. For example, for any given time, a change history of the data object can be provided via the updated transport object. Additionally, in some examples, the database can include the change history of two or more data objects. Thus, for any given time, for each active data object (e.g., active with respect to the system 200), the change history can be provided for the active objects.

In some further implementations, a request is received for the updated transport request. Specifically, the second back-end computing system 204 can provide a request to the CTS 206, the versioning system 208, or both, for the updated transport request. For example, the second back-end computing system 204 can include the testing computing system and the first back-end computing system 202 can include the development computing system. Thus, the request from the second back-end computing system 204 for the transport request can include the transport request being associated with created changes in the data object (from the first back-end computing system 202) and the testing of the changes to the data object (by the second back-end computing system 204). For example, the second back-end computing system 204 can include the productive computing system and the first back-end computing system 202 can include the testing computing system. Thus, the request from the second back-end computing system 204 can include the transport request being associated with tested changes to a data object (by the first back-end computing system 202) and the implementation of the changes to the data object (by the second back-end computing system 204).

In response to receiving the request for the updated transport request, the file-based content of the stored updated transport request is converted to a transport data-file. Specifically, the CTS 206, the versioning system 208, or both, convert the file-based content of the stored updated transport object to a transport data-file. For example, the second back-end computing system 204 is associated with a database-based structure. To that end, for the second back-end computing system 204 to process the updated transport request, the file-based content of the updated transport request is to be converted to a data-file. In some examples, the CTS 206, the versioning system 208, or both, de-serialize the data-file.

Further, in response to receiving the request for the updated transport request, the updated transport object including the transport data-file is provided to the additional back-end computing system. Specifically, the CTS 206, the versioning system 208, or both, provide the updated transport object including the transport data-file to the second back-end computing system 204. In some examples, providing the updated transport object including the transport data-file can include communicating the transport data-file over a network (e.g., the network 130) to the second back-end computing system 204. In some examples, providing the updated transport object including the transport data-file can include providing the updated transport object including the transport data-file to a database associated with the second back-end computing system 204.

In some further implementations, prior to providing the updated transport object including the transport data-file to the additional back-end computing system, a visualization of the updated transport object is provided. The visualization includes a visual preview of the updates (e.g., changes) of the updated transport object against an active data object associated with the updated transport object. Specifically, the CTS 206, the versioning system 208, or both, provide the visualization of the updated transport object, e.g., to a graphical user interface (GUI) associated with a client computing system (not shown), similar to the client computing system 140, prior to providing the updated transport object including the transport data-file to the second back-end computing system 202. The visualization can include a preview (e.g., a "diff") of the updated transport object as compared to an active data object (e.g., currently implemented by the system 200) associated with the updated transport object. In some examples, the comparison can include a visualization of the comparison of the functionality of the updated transport object and the active data object. In some examples, the CTS 206, the versioning system 208, or both, provide the visualization of the updated transport object, e.g., to a graphical user interface (GUI) associated with a client computing system (not shown), similar to the client computing system 140, concurrently with providing the updated transport object including the transport data-file to the second back-end computing system 202.

In some further implementations, the repository stores file-based content for multiple transport objects. For example, the CTS 206, the versioning system 208, or both, store the file-based content of multiple transport objects (including the updated transport object) in a repository (e.g., the repository 128). Additionally, one or more updated objects of the multiple (stored) transport objects are identified. Specifically, the CTS 206, the versioning system 208, or both, identify stored transport objects, for example, stored transport objects that have changes in comparison to a previous version of the transport object (e.g., a "baseline"). In some examples, identifying the one or more updated transport objects can include determining which transport objects have been updated (e.g., changed) in comparison to a previous version of the transport object. That is, determining which transport objects have been updated (e.g., changed) in comparison to the previously provided updated transport object to the additional back-end computing system Further, for each identified updated transport object, the identified updated transport object is restored to a previously-stored version of the transport object. Specifically, the CTS 206, the versioning system 208, or both, restore the identified updated transport object to a previously-stored version (e.g., a "baseline" version) of the transport object. For example, for any given time associated with a transport object, the version of the transport object associated with that given time can be restored, that is, the transport object can be associated with any updates (e.g., changes) associated with that time, and any updates (e.g., changes) associated with any later time, are removed (or otherwise not associated with the transport object). Thus, the transport object may be "rolled back" to a previous version for the second back-end computing system 204. Furthermore, the previously-stored version of the transport object is provided to the additional back-end computing system. Specifically, the CTS 206, the versioning system 208, or both, provide the previously-stored version of the transport object to the second back-end computing system 204 over a network (e.g., the network 130).

In some further implementations, content of consecutive transport requests can be merged (e.g., received transport requests). Specifically, the CTS 206, the versioning system 208, or both, merge the content of received transport requests received from the first back-end computing system 202. For example, the CTS 206, the versioning system 208, or both, receive a list of transport requests (e.g., from the first back-end computing system 202), identifies a current version (e.g., currently stored version) of the transport objects associated with the transport request included in the list, and generates a single, new transport request (e.g., merges the multiple transport requests), which contains only the latest version of any transport object associated with the transport request included in the list (e.g., when the same transport object is part of two transport requests in two different versions, the new transport request contains this transport object only once in the latest version). Thus, when providing the transport requests (e.g., to the second back-end computing system 204), only the single, new transport request is provided containing every transport object only once and in the latest version.

In some further implementations, a transport request is split to facilitate providing the transport request to additional back-end computing systems. Specifically, the CTS 206, the versioning system 208, or both, receive the transport request (e.g., from the first back-end computing system 202), converts the transport request to a list of transport requests that includes only the transport objects that fulfill a certain common criteria, e.g., only transport objects that will be stored in a certain database table. Thus, by doing so, every transport requests can do the de-serialization and database update (import) independently of the other. Thus, processing can be provided in parallel to the second back-end computing system 202.

Figure 3:
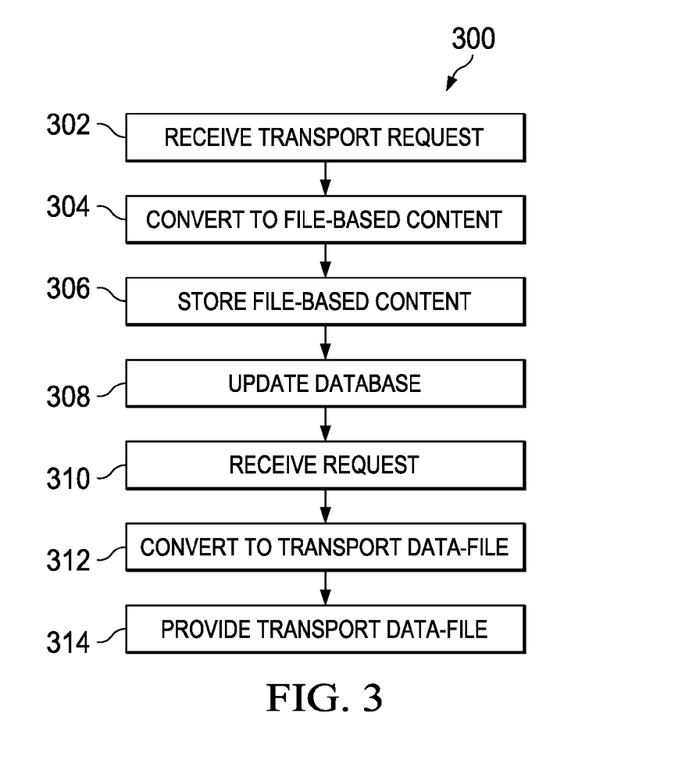
FIG. 3 is a flow chart that illustrates a method for file-based versioning of the data objects.

FIG. 3 is a flow chart that illustrates a method 300 for file-based versioning of the data objects. For clarity of presentation, the description that follows generally describes method 300 in the context of FIGS. 1 and 2. For example, as illustrated, particular steps of the method 300 may be performed on or at an enterprise system, cloud-based system, and/or on-demand system, while other particular steps may be performed on or at a client system or on-premise system. However, method 300 may be performed, for example, by any other suitable system, environment, software, and hardware, or a combination of systems, environments, software, and hardware as appropriate.

In step 302, a transport request that includes an updated transport object is received from a back-end computing system. The updated transport object includes serialized database content of the data object. For example, the CTS 206, the versioning system 208, or both, receive (e.g., over the network 130), from the first back-end computing system 202, the transport request that includes the updated transport object that includes serialized database content of the data object. The updated transport object can be associated with an update to the data object (e.g., an updated data object). In some examples, the data object includes a repository object, or a customizing object.

In step 304, the serialized database content of the updated transport object is converted to file-based content. For example, the CTS 206, the versioning system 208, or both, covert the serialized database content of the updated transport received from the first back-end computing system 202 to file-based content.

In step 306, the file-based content of the updated transport object is stored in a repository over a previously-stored version of the transport object. For example, the CTS 206, the versioning system 208, or both, store the file-based content of the updated transport object in a repository (e.g., the repository 128) over a previously-stored version of the transport object. In some examples, storing the filed based content can include identifying the previously-stored version of the updated transport object and replacing the previously-stored version of the transport object with the updated transport object. For example, the CTS 206, the versioning system 208, or both, identify the previously-stored version of the updated transport object. In some examples, subsequent to identifying the previously-stored version of the updated transport object, storing the file-based content of the updated transport object can further include replacing the previously-stored version of the transport object with the updated transport object.

In step 308, a database is updated that includes a change history of the data object based on the storage of the file-based content in the repository. For example, the CTS 206, the versioning system 208, or both, update a database that includes the change history of the data object based on the storage of the file-based content in the repository. For example, the database can include, for the data object, each version of the transport object, including the previous version of the transport object and the updated transport object.

In step 310, a request is received from an additional back-end computing system for the updated transport object. For example, the second back-end computing system 204 can provide a request to the CTS 206, the versioning system 208, or both, for the updated transport request.

In step 312, in response to receiving the request, the file-based content of the stored updated transport object is converted to a transport data-file. For example, the CTS 206, the versioning system 208, or both, convert the file-based content of the stored updated transport object to a transport data file. In some examples, the file-based content of the updated transport request is to be converted to a data-file.

In step 314, in response to receiving the request, the updated transport request including the transport data-file is provided to the additional back-end computing system. For example, the CTS 206, the versioning system 208, or both, provide the updated transport object including the transport data-file to the second back-end computing system 204. In some examples, prior to provide the updated transport object including the transport data-file to the additional back-end computing system, a visualization of the updated transport object is provided. For example, the CTS 206, the versioning system 208, or both, provide the visualization of the updated transport object, e.g., to a graphical user interface (GUI) associated with a client computing system (not shown), similar to the client computing system 140, prior to providing the updated transports object including the transport data-file to the second back-end computing system 102.

Figure 4:
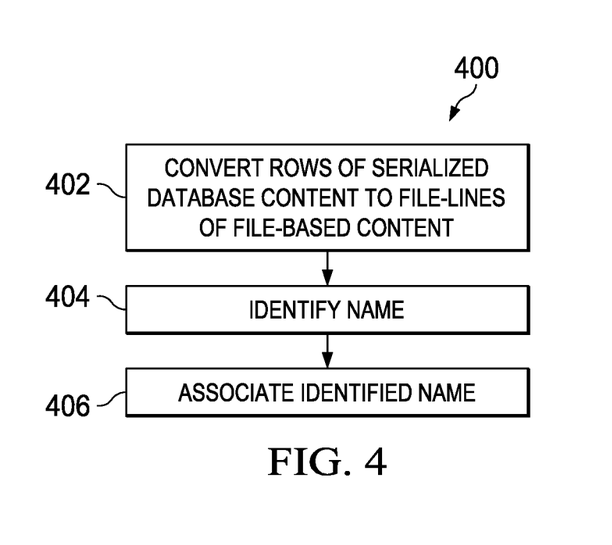
FIG. 4 is a flow chart that illustrates a method for storing data in a file-based versioning system.

FIG. 4 is a flow chart that illustrates a method 400 for storing data in a file-based versioning system. For clarity of presentation, the description that follows generally describes method 400 in the context of FIGS. 1 and 2. For example, as illustrated, particular steps of the method 400 may be performed on or at an enterprise system, cloud-based system, and/or on-demand system, while other particular steps may be performed on or at a client system or on-premise system. However, method 400 may be performed, for example, by any other suitable system, environment, software, and hardware, or a combination of systems, environments, software, and hardware as appropriate.

In step 402, converting each row of data of serialized database content to a file-line of the file-based content. For example, the CTS 206, the versioning system 208, or both, convert each row of data of serialized database content to a file-line of the file-based content (the file-based content including one or more file-lines). In step 404, a name identified is identified that is associated with the data object. For example, the CTS 206, the versioning system 208 or both, or both, identify a name identifier associated with the data object (e.g., a "title" of a system report). In step 406, the identified name identifier is associated with the file. For example, the CTS 206, the versioning system 208, or both, associate the identified name identifier with the file.

Figure 5:
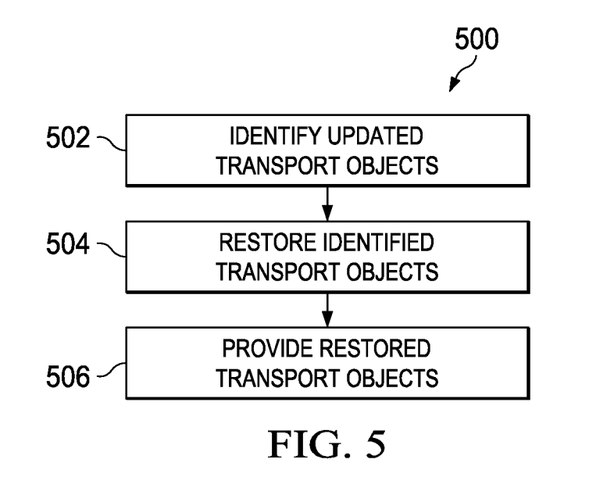
FIG. 5 is a flow chart that illustrates a method for restoring transport objects in a file-based versioning system.

FIG. 5 is a flow chart that illustrates a method 500 for restoring transport objects in a file-based versioning system. For clarity of presentation, the description that follows generally describes method 500 in the context of FIGS. 1 and 2. For example, as illustrated, particular steps of the method 500 may be performed on or at an enterprise system, cloud-based system, and/or on-demand system, while other particular steps may be performed on or at a client system or on-premise system. However, method 500 may be performed, for example, by any other suitable system, environment, software, and hardware, or a combination of systems, environments, software, and hardware as appropriate.

In step 502, one or more updated transport objects are identified that are stored in the repository (of multiple transport objects stored by the repository). For example, the CTS 206, the versioning system 208, or both, identify stored transport objects, for example, stored transport objects that have changed in comparison to a previous version of the transport object (e.g., a "baseline"). In step 504, for each identified updated transport object, the identified updated transport object is restored to a previously-stored version of the transport object. For example, the CTS 206, the versioning system 208, or both, restore the identified updated transport object to a previously-stored version (e.g., a "baseline" version) of the transport object. In step 506, the restored versions of the transport objects are provided to the additional back-end computing system. For example, the CTS 206, the versioning system 208, or both provide the previously-stored version of the transport object to the second back-end computing system 204 over a network (e.g., the network 130).

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 3-5), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method of managing a file-based versioning of data objects, the method comprising:
   for each transport request of two or more transport requests:
      receiving, from a back-end computing system, a transport request that comprises an updated transport object, the updated transport object comprising serialized database content of a data object,
      converting the serialized database content of the updated transport object to file-based content, the file-based content associated with a file-and-folder computer-filing system,
      storing the file-based content of the updated transport object as a file in a repository of the file-and-folder computer-filing system over a previously-stored version of the transport object, wherein a name of the file includes a name identifier that identifies the data object in a customization database associated with a customization of the back-end computing system, and
      updating a database that comprises a change history of the data object based on the storage of the file-based content in the repository;
   merging the two or more transport requests, including:
      identifying, as stored by the database, a current version of each transport object associated with each transport request, a first transport request associated with a previous version of a particular transport object and a second transport request associated with a current version of the particular transport object, and
      generating a unique transport request based on the identified current version of each transport object, the unique transport request including only one version of each transport object.

2. The method of claim 1, wherein storing the file-based content of the updated transport object further comprises:
   identifying the previously-stored version of the updated transport object; and
   replacing the previously-stored version of the transport object with the updated transport object.

3. The method of claim 1, further comprising:
   receiving a request from an additional back-end computing system for the updated transport object;
   in response to receiving the request:
      converting the file-based content of the stored updated transport object to a transport data-file; and
      providing, to the additional back-end computing system, the updated transport object including the transport data-file.

4. The method of claim 3, further comprising:
   prior to providing, to the additional back-end computing system, the updated transport object including the transport data-file, providing a visualization of the updated transport object, the visualization including a visual preview of the updated transport object against an active data object associated with the updated transport object.

5. The method of claim 1, wherein the file-based content includes one or more file-lines, and wherein converting the serialized database content of the transport object to file-based content further comprises: converting each row of data of the serialized database content to a file-line of the file-based content.

6. The method of claim 5, wherein the data object includes at least a portion of a system report present on the back-end computing system; and the name of the file includes the name identifier that is a title of the system report.

7. The method of claim 1, wherein the repository stores file-based content for multiple transport objects, the method further comprising:
   identifying one or more updated transport objects of the multiple transport objects;
   restoring, for each identified updated transport object, the identified updated transport object to a previously-stored version of the transport object; and
   providing, to the back-end computing system, one or more previously-stored versions of one or more transport objects.

8. The method of claim 1, wherein the data object includes a repository object, or a customizing object.

9. A computer storage medium encoded with a computer program, the program comprising instructions that when executed by one or more computers cause the one or more computers to perform operations comprising:
   for each transport request of two or more transport requests:
      receiving, from a back-end computing system, a transport request that comprises an updated transport object, the updated transport object comprising serialized database content of a data object,
      converting the serialized database content of the updated transport object to file-based content, the file-based content associated with a file-and-folder computer-filing system,
      storing the file-based content of the updated transport object as a file in a repository of the file-and-folder computer-filing system over a previously-stored version of the transport object, wherein a name of the file includes a name identifier that identifies the data object in a customization database associated with a customization of the back-end computing system, and
      updating a database that comprises a change history of the data object based on the storage of the file-based content in the repository;

merging the two or more transport requests, including:
identifying, as stored by the database, a current version of each transport object associated with each transport request, a first transport request associated with a previous version of a particular transport object and a second transport request associated with a current version of the particular transport object, and
generating an unique transport request based on the identified current version of each transport object, the unique transport request including only one version of each transport object.

10. The computer storage medium of claim 9, wherein storing the file-based content of the updated transport object further comprises:
identifying the previously-stored version of the updated transport object; and
replacing the previously-stored version of the transport object with the updated transport object.

11. The computer storage medium of claim 9, the operations further comprising:
receiving a request from an additional back-end computing system for the updated transport object;
in response to receiving the request:
converting the file-based content of the stored updated transport object to a transport data-file; and
providing, to the additional back-end computing system, the updated transport object including the transport data-file.

12. The computer storage medium of claim 11, further comprising:
prior to providing, to the additional back-end computing system, the updated transport object including the transport data-file, providing a visualization of the updated transport object, the visualization including a visual preview of the updated transport object against an active data object associated with the updated transport object.

13. The computer storage medium of claim 9, wherein the file-based content includes one or more file-lines, and wherein converting the serialized database content of the transport object to file-based content further comprises:
converting each row of data of the serialized database content to a file-line of the file-based content.

14. The computer storage medium of claim 13, wherein the data object includes at least a portion of a system report present on the back-end computing system; and the name of the file includes the name identifier that is a title of the system report.

15. The computer storage medium of claim 9, wherein the repository stores file-based content for multiple transport objects, the operations further comprising:
identifying one or more updated transport objects of the multiple transport objects;
restoring, for each identified updated transport object, the identified updated transport object to a previously-stored version of the transport object; and
providing, to the additional back-end computing system, the restored versions of the transport objects.

16. A system comprising:
a computing device; and
a computer-readable medium coupled to the computing device and having instructions stored thereon which, when executed by the computing device, cause the computing device to perform operations comprising:
for each transport request of two or more transport requests:
receiving, from a back-end computing system, a transport request that comprises an updated transport object, the updated transport object comprising serialized database content of a data object,
converting the serialized database content of the updated transport object to file-based content, the file-based content associated with a file-and-folder computer-filing system,
storing the file-based content of the updated transport object as a file in a repository of the file-and-folder computer-filing system over a previously-stored version of the transport object, wherein a name of the file includes a name identifier that identifies the data object in a customization database associated with a customization of the back-end computing system, and
updating a database that comprises a change history of the data object based on the storage of the file-based content in the repository;
merging the two or more transport requests, including:
identifying, as stored by the database, a current version of each transport object associated with each transport request, a first transport request associated with a previous version of a particular transport object and a second transport request associated with a current version of the particular transport object, and
generating an unique transport request based on the identified current version of each transport object, the unique transport request including only one version of each transport object.

17. The system of claim 16, wherein storing the file-based content of the updated transport object further comprises:
identifying the previously-stored version of the updated transport object; and
replacing the previously-stored version of the transport object with the updated transport object.

18. The system of claim 16, the operations further comprising:
receiving a request from an additional back-end computing system for the updated transport object;
in response to receiving the request:
converting the file-based content of the stored updated transport object to a transport data-file; and
providing, to the additional back-end computing system, the updated transport object including the transport data-file.

19. The system of claim 18, further comprising:
prior to providing, to the additional back-end computing system, the updated transport object including the transport data-file, providing a visualization of the updated transport object, the visualization including a visual preview of the updated transport object against an active data object associated with the updated transport object.

20. The system of claim 16, wherein the file-based content includes one or more file-lines, and wherein converting the serialized database content of the transport object to file-based content further comprises:
converting each row of data of the serialized database content to a file-line of the file-based content.

* * * * *